United States Patent [19]

Sin et al.

[11] Patent Number: 4,935,826
[45] Date of Patent: Jun. 19, 1990

[54] AUTOMATIC TRACKING DEVICE FOR VIDEO CASSETTE TAPE RECORDER

[75] Inventors: Yong H. Sin, Kyunggi; Seung H. Lee, Inchon, both of Rep. of Korea

[73] Assignee: Goldstar Co. Ltd., Seoul, Rep. of Korea

[21] Appl. No.: 153,448

[22] Filed: Feb. 8, 1988

[51] Int. Cl.$^5$ .................... G11B 5/584; G11B 5/52; G11B 15/467
[52] U.S. Cl. .................. 360/77.13; 360/10.3; 360/70; 360/73.09
[58] Field of Search ............... 360/10.1–10.3, 360/70, 73.04, 73.09, 73.11, 73.12, 73.14, 75, 77.12, 77.13, 77.14, 77.16

[56] References Cited

U.S. PATENT DOCUMENTS

| | | | |
|---|---|---|---|
| 4,402,023 | 8/1983 | Hiraguri | 360/77.13 |
| 4,470,079 | 9/1984 | Tsuruta | 360/10.2 |
| 4,556,920 | 12/1985 | Maeda et al. | 360/10.2 |
| 4,587,581 | 5/1986 | Serafini | 360/77.13 |

*Primary Examiner*—Alan Faber
*Assistant Examiner*—Steven R. Garland

[57] ABSTRACT

An automatic tracking device which reproduces the biggest and clearest FM video signals onto a screen utilizes the concept that the width of the video heads are to be formed larger than the track of the video tape. The size of the video signals reproduced from these video heads are compared. From this comparison the automatic tracking device controls the video heads or tape speed to cause the video signal to be the same size without requiring a separate control track. This controlling of the video signals allows the biggest FM video signals to appear on a screen having substantially no noise.

16 Claims, 7 Drawing Sheets

FIG. 10

AUTOMATIC TRACKING DEVICE FOR VIDEO CASSETTE TAPE RECORDER

BACKGROUND OF THE INVENTION

The present invention relates to a tracking device for a video cassette tape recorder, and more particularly to improvements in an automatic tracking device for a video cassette tape recorder.

Generally, to reproduce the biggest and clearest FM video signals which have been recorded on a video track without noise onto a screen, two video heads mounted on a rotating head drum have to track the video tracks on a video tape properly and accurately.

For this purpose, a typical video tape has a control track of a predetermined width positioned at its lower part for the recording of FM video signals. When the FM video signals are reproduced, the recorded control signals are also reproduced, delayed for a predetermined time according to a parameter of variable resistance for tracking and then inputted into a servo circuit of a capstan motor. The servo circuit for controlling the speed of revolution of the capstan motor will cause the two video heads mounted on rotating head drum to track properly and accurately along the track on video tape.

However, the above tracking device has disadvantages because it is difficult for the users to operate the tracking device in an optimum manner, thereby causing the tracking device to become cumbersome to operate since the tracking device must have a control track for recording and reproducing control signals. The users in this situation, by varying the variable resistance for tracking, have to determine the delayed time for the reproduced control signals.

Recently, various automatic tracking devices have been developed for accurate tracking of video heads on video track. However, those also have disadvantages because a control track is needed on a video tape for recording and reproducing control signals.

SUMMARY OF THE INVENTION

An object of the present invention is to provide an automatic tracking device which does not require the use of a separate control track on a video tape by adjusting automatically the tracking wherein the tracking is realized by not using the control signals and tracking operations by users.

Another object of the present invention is to provide an automatic tracking device which the size of FM video signals reproduced from two video heads may appear biggest and the noise signals may not appear on the reproduced screen when the running of the video tape is stopped and the FM video signals are reproduced.

The tracking device made according to these objects have two video heads mounted on a rotating head drum, each having a width larger than that of the video track. By comparing the size of the FM video signal reproduced from one of the video head with that from the other of the video head thus detecting error voltage, the tracking device of the present invention is achieved.

BRIEF DESCRIPTION OF THE DRAWINGS

The present invention will be more clearly understood from the description as set forth below with reference to the accompanying drawings, wherein:

FIGS. 7(A) to 7(I) are the waveform diagram of each device shown in FIGS. 5,6;

DESCRIPTION OF THE PREFERRED EMBODIMENTS

Figure 1:
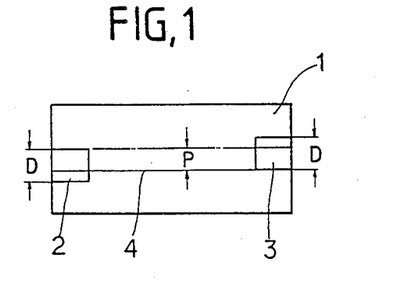
FIG. 1 is a front view of the principal part of the present invention showing a rotating head drum on which two video heads are mounted.

Referring now to FIG. 1, there is shown a rotating head drum 1 on which two video heads 2 and 3 are mounted. Each of the video heads 2 and 3 has a different aximuth angle and is disposed forming an angle of 180° with the rotating head drum 1. The video heads 2 and 3 are exchangeable in their disposition.

The width P of each of the video heads 2 and 3 is somewhat larger than the width of the video track on video tape, that is, approximately 1.5 times the width of the track. The lower end of the second video head 3 is level with a base plane 4 and the upper end of the first video head 2 is higher than the base plane 4 by the width P of the track.

Figure 2A:
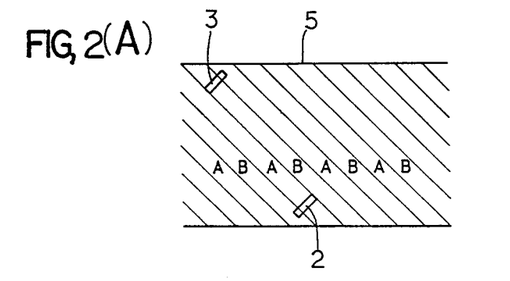
FIGS. 2(A),3(A) and 4(A) show track of the video heads embodying the present invention, respectively.
Figure 2B:
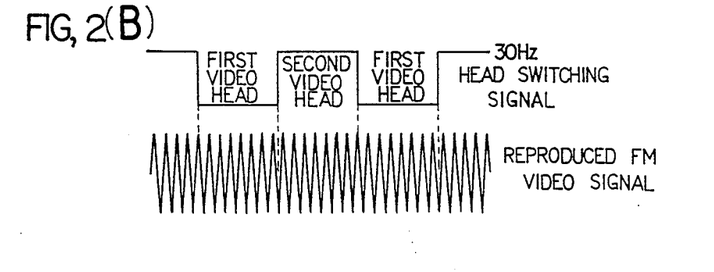
FIGS. 2(B),3(B) and 4(B) show respective size of the FM video signal reproduced from the track shown in FIGS. 2(A), 3(A) and 4(A), respectively.
Figure 3A:
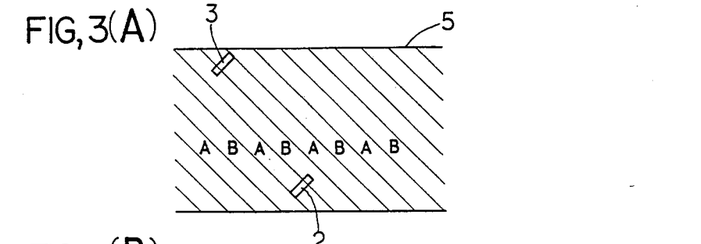
Figure 3B:
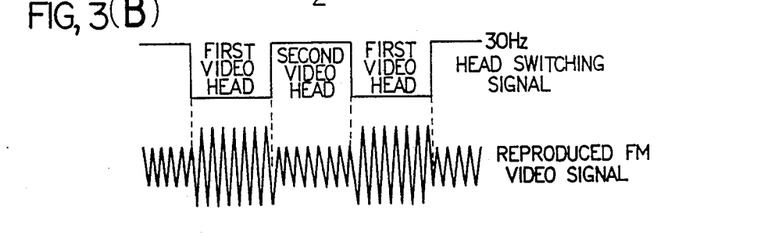
Figure 4A:
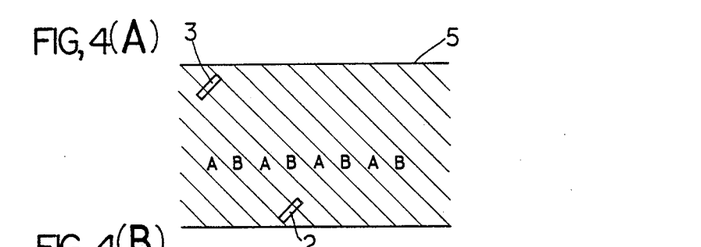
Figure 4B:
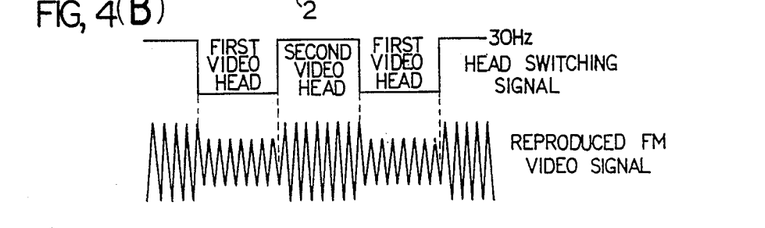

The operation of the automatic tracking device constructed as above is as follows. In FIG. 2(A), when the first and second video heads 2 and 3 track their corresponding tracks A and B of video tape 5 accurately using a 30 Hz head switching signal HS as shown in FIG. 2(B), the reproduced FM video signals from the heads 2 and 3 have same size as the widths of video tracks A and B are same. In case when the running speed of the video tape 5 is fast, that is, when the video heads 2 and 3 track their corresponding video tracks A and B a little slowly, the width of the video track B on which the second video head 3 tracks gets narrower than that of video track A on which the first video head 2 tracks, whereby as shown in FIG. 3(B), the FM video signal reproduced from the second video head 3 gets smaller than that from the first video head 2. Conversely, as shown in FIG. 4(B), somewhat faster tracking of the first and second video heads 2 and 3 on tracks A and B will cause the FM video signal reproduced from the first video head 2 to get smaller than that from the second video head 3.

When each of the first and second video heads 2 and 3 is tracking the corresponding tracks A and B, each head also will track the adjacent track B or A. Even in this case, the FM video signal recorded on the video track B is not reproduced by the first video head 2 and the FM video signal recorded on the video track A is not reproduced by the second video head 3 since the azimuth angle of the first video head 2 is different from that of the second video head 3.

Figure 5:
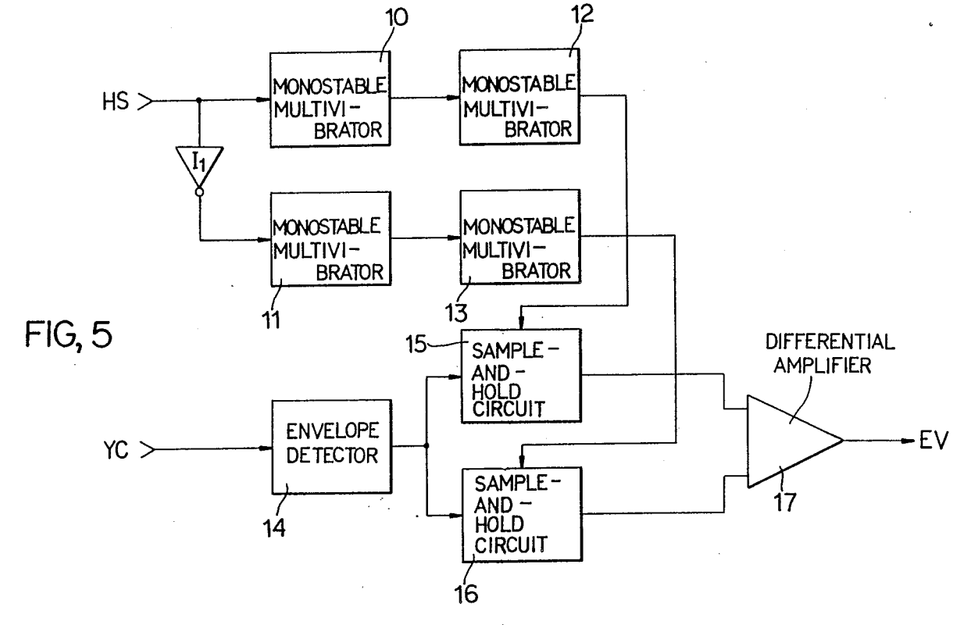
FIG. 5 is a block diagram of an error voltage detector of the automatic tracking device of the present invention.
Figure 6:
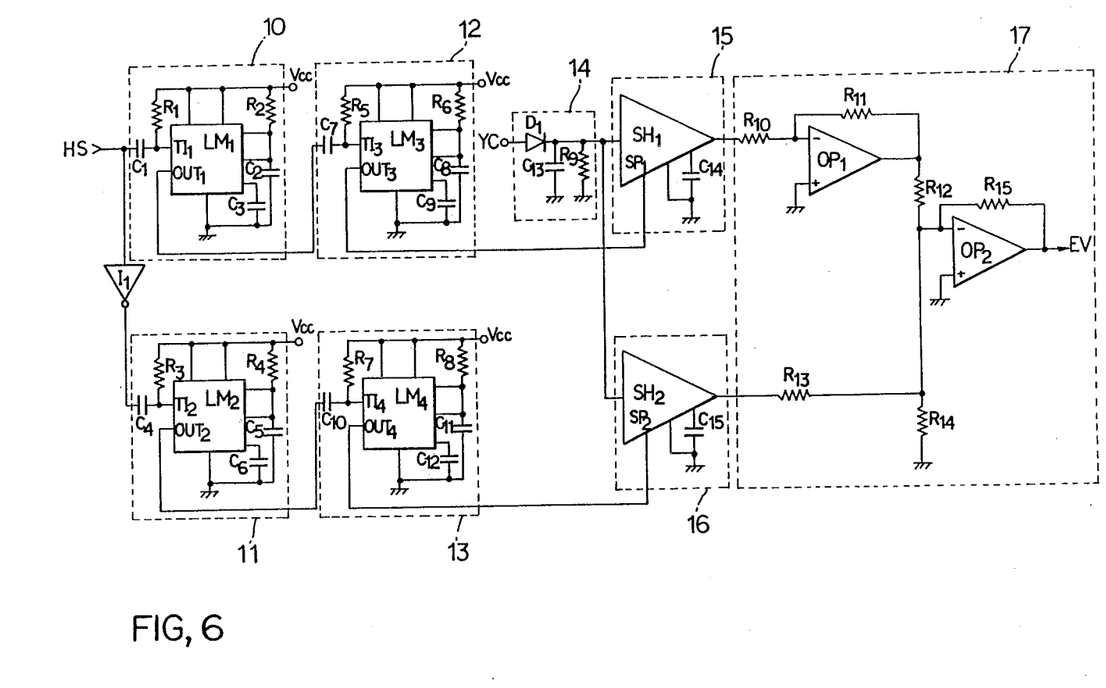
FIG. 6 is a detailed circuit diagram of the FIG. 5.

FIGS. 5 and 6 are a block diagram of phase error voltage detector and a detail view thereof, respectively, which detector detects phase error voltage of capstan motor when the FM video signals reproduced from each of the video heads 2 and 3 are mixed upon input. As shown, the phase error voltage detector comprises an inverter $I_1$ for converting the Hz head switching signal HS; monostable multivibrators 10 and 11 having integrated elements $LM_1$ and $LM_2$ for outputting pulse signal of a predetermined width in accordance with the 30 Hz head switching signal HS and the output signal of the inverter $I_1$; resistances $R_1$, $R_2$, $R_3$ and $R_4$ and condensers $C_1$–$C_6$ other monostable multivibrators 12 and 13 having monostable multivibrator integrated elements for outputting a sample pulse signal at the lower part of the output signal of the monostable multivibrators 10 and 11; resistances $R_5$, $R_6$, $R_7$ and $R_8$ and condensers $C_7$–$C_{12}$; an envelope detector 14 having a diode $D_1$ for detecting the envelope of the reproduced FM video signal YC, a condenser $C_{13}$ and a resistance $R_9$; sample-and-hold circuits 15 and 16 having integrated elements $SH_1$ and $SH_2$ for sampling and outputting the output signal of the envelope detector 14 and condensers $C_{14}$ and $C_{15}$; and a differential amplifier 17 having operational amplifiers $OP_1$ and $OP_2$ for comparing the size of the output signals between the sample-and-hold circuits 15 and 16 and for detecting error voltage EV, and resistances $R_{10}$ to $R_{15}$. The "Vcc" in FIG. 6 is electric power source terminal.

The automatic tracking device of the present invention constructed as above is operated as follows. The electric power is applied to the electric power source terminal Vcc and the 30 Hz head switching signal HS is inputted. Then the 30 Hz head switching signal HS is differentiated by a differentiator having a condenser $C_1$ and a resistance $R_1$. The differentiated signal is applied to a trigger terminal $TI_1$ as shown in FIG. 7(B) to be inverted through the inverter $I_1$. The inverted 30 Hz head switching signal is then differentiated by differentiator comprising a condenser $C_4$ and a resistance $R_3$ and applied to the trigger terminals $TI_2$ of the monostable multivibrator integrated element $LM_2$. The monostable multivibrator integrated elements $LM_1$ and $LM_2$ output the pulse signals as shown in FIG. 7(C) and 7(D) through output terminals $OUT_1$ and $OUT_2$ in accordance with the time constant of the resistances $R_2$ and $R_3$ and condensers $C_2$ and $C_5$. Each of the pulse signals outputted from the monostable multivibrator integrated elements $LM_1$ and $LM_2$ is differentiated by the differentiators comprising condenser $C_7$ or $C_{10}$ and resistances $R_5$ or $R_7$ and then inputted to the trigger terminals $TI_3$ and $TI_4$ of the integrated elements $LM_3$ and $LM_4$ of the monostable multivibrators. Thus, the integrated elements $LM_3$ and $LM_4$, having the time constant of the resistances $R_6$ and $R_8$ and condensers $C_8$ and $C_9$ output a sample pulse signal to the output terminals $OUT_3$ and $OUT_4$ and applies the sample pulse signal to the sampling terminals $SP_1$ and $SP_2$ of the sample-and-hold integrated elements $SH_1$ and $SH_2$.

Figures 7A, 7I:
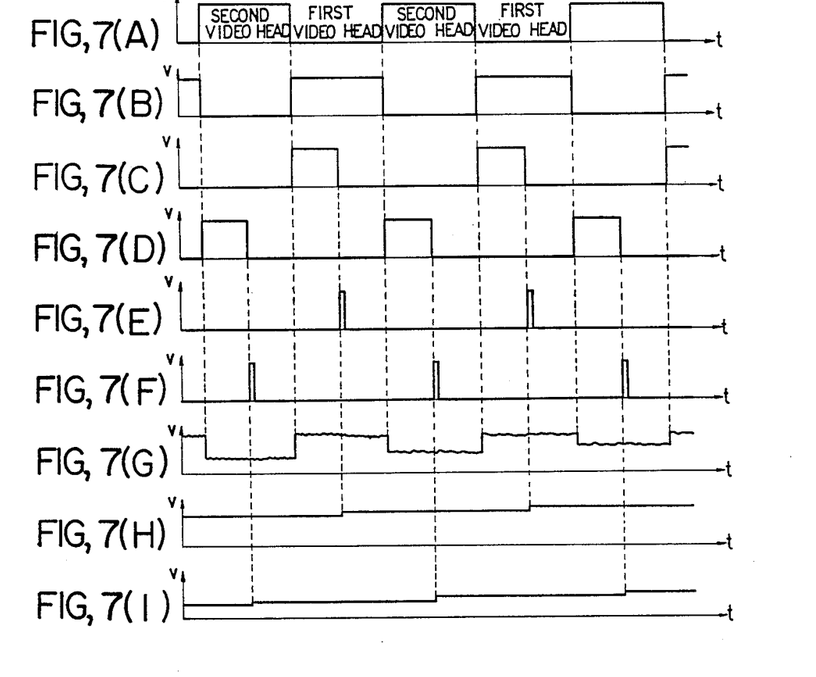

Further, provided that the inputting of the reproduced FM video signal YC is synchronized with the 30 Hz switching signal HS, the FM video signal YC being reproduced while the video heads 2 and 3 are tracking their corresponding tracks A and B, and that the envelope from the inputted FM video signal is detected by the detector 14 as shown in FIG. 7(G), the integrated elements $SH_1$ and $SH_2$ of the sample-and-hold circuit sample the output from the envelope detector 14 according to the sample pulse signal which is outputted from the multivibrator integrated elements $LM_3$ and $LM_4$ and stores the output signal from the envelope detector 14 in the corresponding condensers $C_{14}$ and $C_{15}$ to output the signal as shown in FIGS. 7(H) and 7(I). The output signal from the sample-and-hold integrated element $SH_1$ is inverted by inverter amplifier comprising the resistances $R_{10}$ and $R_{11}$ and the operational amplifier $OP_1$ and is inputted to inverter input terminal "—" through the resistance $R_{12}$. The output signal from the sample-and-hold integrated element $SH_2$ is inputted through the resistance $R_{13}$ to the inverter input terminal "—" of the operational amplifier $OP_2$. Thus, the operational amplifier $OP_2$ outputs the error voltage EV which corresponds to the difference of the output signals between the sample-and-hold integrated elements $SH_1$ and $SH_2$. The error voltage EV, thus outputted is inputted to the servo circuit for controlling the capstan motor wherein capstan motor causes the video heads 2 and 3 to be tracked accurately along video tracks A and B. When the FM video signal reproduced by the video head 2 and sampled and outputted by the sample-and-hold integrated element $SH_1$ is bigger than that reproduced by the video head 3 and sampled and output by the sample-and-hold integrated element $SH_2$, the servo circuit controls the phase of the capstan motor for a faster running of the video tape 5. While when the reproduced FM video signal by the video head 2 is smaller than that by the video head 3, the servo circuit controls the capstan motor for a slower running of the video tape 5 so that the video heads 2 and 3 may track the video tracks A and B properly and accurately.

Figure 8:
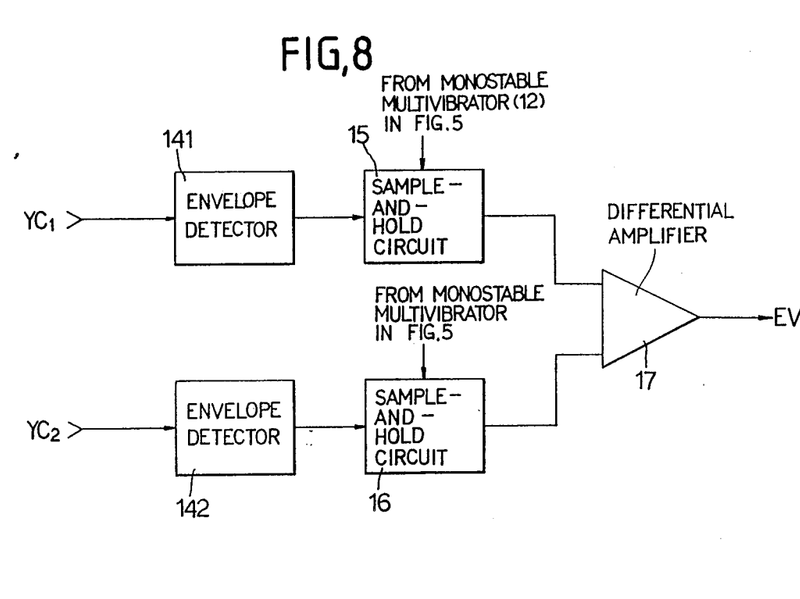
FIG. 8 is a circuit diagram of another error voltage detector embodying the present invention.

FIG. 8 is another example of a block diagram of an error voltage detector for detecting the phase error voltage of the capstan motor embodying the present invention showing when the FM video signals reproduced by the first and second video heads 2 and 3 are independently inputted. Each of envelope detectors 141 and 142 detects the envelope of the FM video signals $YC_1$ or $YC_2$ reproduced by the video heads 2 and 3 and outputs to the envelope sample-and-hold circuits 15 and 16. The FM video signals $YC_1$ and $YC_2$ are reproduced when the video heads 2 and 3 are tracking the video tracks A and B and then are inputted to the envelope detectors 141 and 142. The detectors 141 and 142 detect the envelopes of the reproduced FM video signals $YC_1$ and $YC_2$ and the detected envelopes are inputted to the sample-and-hold circuits 15 and 16, are sampled, according to the output signal of the monostable multivibrators 12 and 13 and are compared in the differentiator 17 thus outputting the phase error voltage EV of the capstan motor.

In the above example of the error voltage detector, the error voltage outputted from the differentiator amplifier 17 controls the phase of the capstan motor while in this second example, the error voltage EV outputted from the differentiator amplifier 17 is inputted to the servo circuit of the drum motor which controls the rotating head drum 1 whereby the video heads 2 and 3 track properly and accurately along the tracks A and B.

Figure 9A:
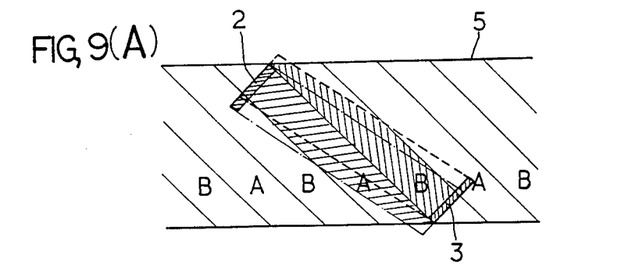
FIG. 9(A) shows track of the video heads of the automatic tracking device of the present invention in reproduced condition.
Figure 9B:
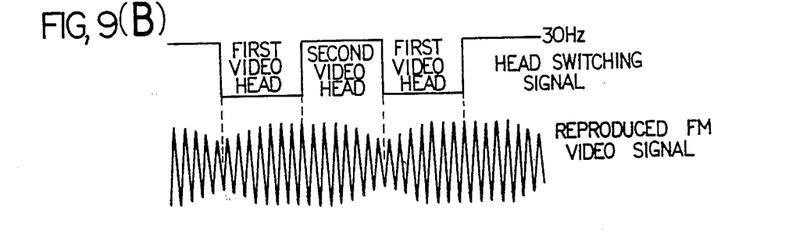
FIG. 9(B) shows size of the FM video signals reproduced from the track in FIG. 9(A) in reproduced condition.

When desiring reproduction, the output signals of the sample-and-hold circuits 15 and 16 are inputted to a comparator and compared. As shown in FIG. 9(A), stopping the driving of the capstan motor at the time when the compared two signals are of the same size, that is to say, when the video signals reproduced by the video heads 2 and 3 are of the same size, causes the widths of the video tracks A and B with respect to the video heads 2 and 3 to get wider, and thus, the reproduced FM video signals to get bigger resulting in substantially no noise signals appearing on a screen.

Figure 10:
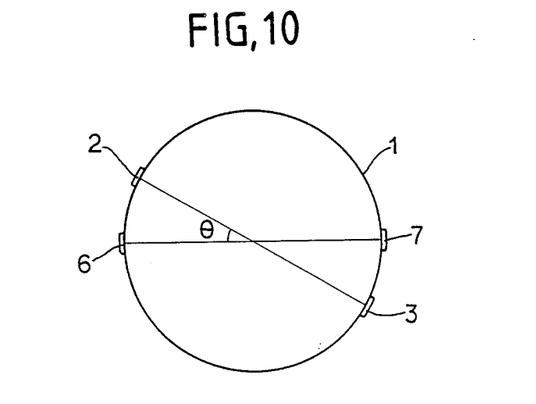
FIG. 10 is a plane view of another rotating head drum of the present invention on which first and second video heads are mounted.

In utilizing this invention, as shown in FIG. 10, the rotating head drum 1 may have video heads 6 and 7 for recording FM video signals formed thereon and the video heads 2 and 3 formed thereon for maintaining predetermined angle $\theta$ with the video heads 6 and 7.

As mentioned above, in the automatic tracking device of the present invention, the width of each of the two video heads is formed slightly larger than that of the video track. By comparing the two FM video signals reproduced from the two video heads and making the two signals correspond to the same size by controlling the tracking, the automatic tracking device of the present invention does not require a separate control track for recording and reproducing video signals.

What is claimed is:

1. An automatic tracking device for a video cassette tape recorder comprising:
    a rotating head drum;
    first and second video heads mounted on said rotating head drum having different azimuth angles;
    said first and second video heads tracking corresponding video tracks on a video tape to reproduce first and second FM video signals, respectively;
    each of said video heads having a width larger than a width of said video tracks;
    error voltage detector means, operatively connected to said first and second video heads, for detecting a presence of an error voltage in said first and second FM video signals produced by said first and second video heads; and
    servo circuit control means, operatively connected to said error voltage detector means, for controlling a phase of a capstan motor to minimize said error voltage in said first and second FM video signal;
    said error voltage detector means delaying one of said FM video signals produced by said first and second video heads such that said first and second FM video signals are compared together.

2. The automatic tracking device as claimed in claim 1 further comprising:
    head switching signal means, operatively connected to said error voltage detector means, for producing a head switching signal;
    said error voltage detector means including,
        inverter means, operatively connected to said head switching signal means, for inverting said head switching signal;
        monostablevibrator means, operatively connected to said inverter means and said head switching signal means, for producing sample pulse signals in accordance with said head switching signal and the inverted head switching signal;
        envelope detector means, operatively connected to said first and second video heads, for detecting an envelope of said first and second FM video signals and producing first and second voltage signals representing the detected envelope of said first and second FM video signals, respectively;
        sample and hold means, operatively connected to said envelope detector means and said monostablevibrator means, for sampling and holding either said first voltage signal or said second voltage signal in accordance with said sample pulse signals, thereby causing said first and second voltage signals to be simultaneously present at outputs of said sample and hold means; and
        comparator means, operatively connected to said sample and hold means, for comparing said first and second voltage signals and producing said error voltage from the comparison.

3. The automatic tracking device as claimed in claim 2, wherein said head switching signal has a frequency of 30 Hz.

4. The automatic tracking device as claimed in claim 2, wherein said error voltage detector means causes said servo control circuit to stop the capstan motor to produce a still picture only when said first and second voltage signals are determined to have a same magnitude.

5. The automatic tracking device as claimed in claim 2, wherein said sample and hold means sample and hold both said first and second voltage signal.

6. An automatic tracking device for a video cassette tape recorder comprising:
    a plurality of video heads mounted on a rotating head drum, each video head having a different azimuth angle and a width larger than a width of a video track on the video cassette tape, said video heads producing a FM video signal from the video cassette tape;
    envelope detector means, operatively connected to said plurality of video heads, to detect an envelope of said FM video signals and to produce a separate voltage signal for each detected envelope;
    sample and hold means, operatively connected to said envelope detector means, for sampling and holding each voltage signal produced by said envelope detector means, thereby causing said voltage signals to be simultaneously present at outputs of said sample and hold means; and
    motor control means, operatively connected to said sample and hold means, for comparing said voltage signals to determine an error between magnitudes of said voltage signals;
    said motor control means controlling a speed of tracking in accordance with said error.

7. The automatic tracking device as claimed in claim 6 further comprising:
    head switching signal means for producing a head switching signal;
    inverter means, operatively connected to said head switching signal means, for inverting said head switching signal; and
    monostablevibrator means, operatively connected to said inverter means and said envelope detector means, for producing sample pulse signals in accordance with said head switching signal and the inverted head switching signal, said sample pulse signals controlling the sampling and holding operations of said sample and hold means.

8. The automatic tracking device as claimed in claim 7, wherein said head switching signal has a frequency of 30 Hz.

9. The automatic tracking device as claimed in claim 6, wherein said motor control means comprises:
    comparator means, operatively connected to said sample and hold means for comparing said voltage signals and producing said error from the comparison; and servo control means, operatively connected to said comparator means, for controlling a phase of a capstan motor in accordance with said error.

10. The automatic tracking device as claimed in claim 6, wherein said motor control means controls a speed of rotation for said rotating drum.

11. The automatic tracking device as claimed in claim 6, wherein said motor control means controls a speed of the video tape.

12. A method for automatically tracking in a video cassette tape recorder comprising the steps of:
- (a) rotating a plurality of video heads mounted on a rotating head drum, each video head having a different azimuth angle and a width larger than a width of a track on the video cassette tape;
- (b) producing a plurality of FM video signals during the execution of said step (a);
- (c) detecting an envelope for each FM video signal produced in said step (b);
- (d) producing a voltage signal for each envelope detected in said step (c);
- (e) sampling and holding each voltage signal produced in said step (d), thereby causing the voltage signals to be simultaneously present;
- (f) comparing the simultaneously present voltage signals of said step (e) to determine an error between magnitudes of the voltage signals; and
- (g) controlling a speed of tracking in accordance with the error determined in said step (f).

13. The method as claimed in claim 12, further comprising the steps of:
- (h) producing a head switching signal;
- (i) inverting the head switching signal; and
- (j) producing sample pulse signals in accordance with the head switching signal produced in said step (h) and the inverted head switching signal produced in said step (i);

wherein the sample pulse signals control the execution of said step (e).

14. The method as claimed in claim 13, wherein said step (h) produces a head switching signal having a frequency of 30 Hz.

15. The method as claimed in claim 12, wherein said step (g) controls a speed of rotation of the rotating drum.

16. The method as claimed in claim 12, wherein said step (g) controls a speed of the video cassette tape.

* * * * *